United States Patent
Tong et al.

(10) Patent No.: US 11,051,196 B2
(45) Date of Patent: *Jun. 29, 2021

(54) WIRELESS COMMUNICATION TERMINAL AND METHOD THEREOF

(71) Applicant: Sun Patent Trust, New York, NY (US)

(72) Inventors: Hui Tong, Beijing (CN); Masayuki Hoshino, Kanagawa (JP); Akihiko Nishio, Osaka (JP); Ming Xu, Beijing (CN)

(73) Assignee: Sun Patent Trust, New York, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/548,521

(22) Filed: Aug. 22, 2019

(65) Prior Publication Data

US 2019/0380058 A1   Dec. 12, 2019

Related U.S. Application Data

(63) Continuation of application No. 16/210,513, filed on Dec. 5, 2018, now Pat. No. 10,433,202, which is a
(Continued)

(51) Int. Cl.
*H04W 24/10* (2009.01)
*H04L 1/00* (2006.01)
(Continued)

(52) U.S. Cl.
CPC ........... *H04W 24/10* (2013.01); *H04L 1/0026* (2013.01); *H04L 25/0224* (2013.01); *H04L 5/0048* (2013.01)

(58) Field of Classification Search
CPC .. H04W 24/10; H04L 1/0026; H04L 25/0224; H04L 5/0048
See application file for complete search history.

(56) References Cited

U.S. PATENT DOCUMENTS 8,369,209 B2   2/2013   Zhang et al.
2004/0151114 A1   8/2004   Ruutu
(Continued)

FOREIGN PATENT DOCUMENTS

CN   101646251 A   2/2010
CN   102170656 A   8/2011
(Continued)

OTHER PUBLICATIONS

Extended European Search Report, dated Feb. 22, 2016, for corresponding EP Application No. 12874929.8-1874 / 2880891, 10 pages.
(Continued)

*Primary Examiner* — Walter J Divito
*Assistant Examiner* — Anthony Luo
(74) *Attorney, Agent, or Firm* — Seed IP Law Group LLP

(57) ABSTRACT

There are provided a wireless communication method of configuring a measurement resource and a wireless communication device therefor. The method comprises determining a measurement resource to be disregarded when the number of measurement resources configured in one subframe exceeds the maximum number of measurement resources that a user equipment is able to measure in one subframe, wherein the measurement resource with lower priority is determined to be disregarded, and the measurement resource is not disregarded A times within the duration of N subframes, where A is an integer larger than 1, N corresponds to one plus B*periodicity of the measurement resource, and B is an integer equal to or larger than 1.

20 Claims, 7 Drawing Sheets

Related U.S. Application Data continuation of application No. 15/841,062, filed on Dec. 13, 2017, now Pat. No. 10,182,366, which is a continuation of application No. 14/112,227, filed as application No. PCT/CN2012/079477 on Aug. 1, 2012, now Pat. No. 9,877,217.

(51) Int. Cl.
*H04L 25/02* (2006.01)
*H04L 5/00* (2006.01)

(56) References Cited

U.S. PATENT DOCUMENTS

| | | |
|---|---|---|
| 2007/0019551 A1 | 1/2007 | Pozhenko et al. |
| 2011/0007696 A1 | 1/2011 | Dayal et al. |
| 2011/0116364 A1 | 5/2011 | Zhang et al. |
| 2012/0039220 A1 | 2/2012 | Chen et al. |
| 2012/0076028 A1 | 3/2012 | Ko et al. |
| 2012/0082052 A1 | 4/2012 | Oteri et al. |
| 2012/0113850 A1 | 5/2012 | Fu et al. |
| 2013/0223271 A1 | 8/2013 | Huang et al. |
| 2013/0258965 A1 | 10/2013 | Geirhofer et al. |

FOREIGN PATENT DOCUMENTS

| | | |
|---|---|---|
| CN | 102215516 A | 10/2011 |
| CN | 102480342 A | 5/2012 |
| WO | 2011/147349 A1 | 12/2011 |
| WO | 2012/045272 A1 | 4/2012 |

OTHER PUBLICATIONS

International Search Report and Written Opinion of the International Searching Authority dated May 9, 2013, for corresponding International Application No. PCT/CN2012/079477, 8 pages.

LG Electronics, "Details of CSI Reporting in Time-domain eICIC," R1-110381, Agenda Item: 6.2.6, *3GPP TSG RAN WG1 Meeting #63bis*, Dublin, Ireland Jan. 17-21, 2011, 6 pages.

LG Electronics, "UL CC selection for UCI transmission on PUSCH," R1-104764, Agenda Item: 6.2.5, *3GPP TSG RAN WG1 Meeting #62*, Madrid, Spain, Aug. 23-27, 2010, 5 pages.

Panasonic, "On constraint to limit UE processing requirements in CoMP," R1-123277, 3GPP TSG RAN WG 1 Meeting #70, Agenda Item: 7 .5 .1.1 Remaining details of size of CoMP measurement set, Qingdao, China, Aug. 13-17, 2012, 2 pages.

1001 determining a MR to be disregarded when the number of MRs configured in one subframe exceeds the maximum number of MRs that a UE is able to measure in one subframe, wherein the MR with lower priority is determined to be disregarded, and the priority of the measurement resource is increased according to previous disregarding(s) of the measurement resource

WIRELESS COMMUNICATION TERMINAL AND METHOD THEREOF

BACKGROUND

Technical Field

The present disclosure relates to a wireless communication method of configuring measurement resource, and a wireless communication device therefor.

Description of the Related Art

In Long Term Evolution-Advanced (LTE-A) Rel-11, it was agreed to configure measurement resource (MR) to each user equipment (UE) for at least the purpose of deriving Channel Quality Indicator (CQI). A UE may report multiple CQIs. For each CQI, the signal part and interference part may be measured based on different MRs, respectively. To reduce specification effort and keep backward compatibility, the MRs are Channel State Information-Reference Signal (CSI-RS) in Rel-10. The MRs for signal measurement are non-zero-power (NZP) CSI-RS, while the MRs for interference measurement can be zero-power CSI-RS.

It is noted that UE complexity increases with the number of configured MRs. Because UE needs to prepare for possible aperiodic CSI request, UE has to measure all the configured MRs even when some MR(s) does not correspond to any configured CSI reports. Therefore, it is sensible to apply some constraint on MR configurations to limit UE processing requirements.

The most concerned UE complexity is how many MRs can be processed within one subframe. As a consequence, the constraint is to limit/specify the maximum number of MR(s) that can be measured in one subframe.

However, in reality, a network (NW) may be difficult to avoid configuring a certain number of MRs in one subframe for a UE, especially when the NW prefers a flexible Coordinated Multi-Point (CoMP) operation, in which MRs corresponding to various CoMP operations need to be configured. Therefore, the actually configured MRs may out-number the maximum MRs that a UE can measure, which is called MR collision in this specification. MR collision cannot be avoided even by elaborate MR allocation in some cases. For example, if joint transmission (JT) among 3 cells (macro/pico/pico) is supported, it is not possible to avoid 3 MRs in one subframe. FIG. 1 shows an example of MR collision. In FIG. 1, the number of actually configured MRs (MR1, MR2, and MR3) in some subframes is 3, while the maximum number of MRs that a UE can measure in one subframe is only 2; therefore, MR collision occurs in some subframes, which are embraced by the ellipses in FIG. 1.

One solution to solve the above problem that actually configured MRs out-number maximum MRs that a UE can measure is to disregard (not measure) all MRs within the subframe. However, this would cause inaccurate CQI and consequently reduce system throughput. The preferred UE behavior is to disregard only the over-numbered MR(s). UE may calculate CQIs related to disregarded MR(s) based on old MRs. Another alternative is to report "out-of-range" CQI in this case and not calculate CQIs. However, this alternative is not preferred because the outdated MR may be still useful.

Which MR(s) are to be disregarded may be left as UE implementation and not specified. However, in this case, the eNode B (eNB) does not know which CQIs are calculated based on old MR(s). In other words, eNB has no information on which CQI(s) are out of date and could make wrong scheduling decisions. Therefore, it is preferred to specify and/or configure which MR(s) are disregarded at UE side.

The most straightforward way to disregard is based on priority, i.e., the MR with lower priority is disregarded. The priority may be explicitly signaled from eNB, or can be implicitly configured based on the order of MR configuration. However, in this case, the MR with lowest priority is always disregarded. If the collision occurs in all subframes containing the MR with lowest priority, the CQI related to the lowest priority is completely wrong. This is strongly not preferred. FIG. 2 shows an example of disregarding based on priority. In this example, three MRs are configured, in which MR1 has the highest priority (most important), MR2 has middle priority (second important), and MR3 has the lowest priority (least important). It is shown that MR3 is always disregarded in the subframes with collision since it has the lowest priority. Therefore, CQI related to MR3 is completely wrong, which is not acceptable.

BRIEF SUMMARY

In view of the above, the present disclosure is made to avoid always disregarding a same MR based on a specification and/or signaling as simple as possible.

In one aspect of the present disclosure, there is provided a wireless communication method of configuring a measurement resource (MR), comprising: determining a MR to be disregarded when the number of MRs configured in one subframe exceeds the maximum number of MRs that a UE is able to measure in one subframe, wherein the MR with lower priority is determined to be disregarded, and the MR is not disregarded A times within the duration of N subframes, where A is an integer larger than 1, N corresponds to one plus B*periodicity of the MR, and B is an integer equal to or larger than 1.

In another aspect of the present disclosure, there is provided a wireless communication method of configuring a measurement resource (MR), comprising: determining a MR to be disregarded when the number of MRs configured in one subframe exceeds the maximum number of MRs that a UE is able to measure in one subframe, wherein the MR with lower priority is determined to be disregarded, and the priority of the measurement resource is increased according to previous disregarding(s) of the measurement resource.

In a further aspect of the present disclosure, there is provided a wireless communication method of configuring a measurement resource (MR), comprising: determining a MR to be disregarded when the number of MRs configured in one subframe exceeds the maximum number of MRs that a UE is able to measure in one subframe, wherein the MR with lower priority is determined to be disregarded; and if a channel state information (CSI) report is aperiodically triggered, increasing the priority of MR(s) related to the CSI to be higher than other MR(s) when the MR(s) related to the CSI is between the aperiodic trigger and relevant uplink (UL) CSI report.

In a further aspect of the present disclosure, there is provided a wireless communication method of configuring a measurement resource (MR), comprising: determining a MR to be disregarded when the number of MRs configured in one subframe exceeds the maximum number of MRs that a UE is able to measure in one subframe, wherein each configured MR is disregarded one or more times in a round robin manner, and the MR with lower priority is disregarded no less than the one with higher priority.

In a further aspect of the present disclosure, there is provided a wireless communication device of configuring a measurement resource (MR), comprising: a disregarding determination unit configured to determine a MR to be disregarded when the number of MRs configured in one subframe exceeds the maximum number of MRs that a UE is able to measure in one subframe, wherein the MR with lower priority is determined to be disregarded, and the MR is not disregarded A times within the duration of N subframes, where A is an integer larger than 1, N corresponds to one plus B*periodicity of the MR, and B is an integer equal to or larger than 1.

In a further aspect of the present disclosure, there is provided a wireless communication device of configuring a measurement resource (MR), comprising: a disregarding determination unit configured to determine a MR to be disregarded when the number of MRs configured in one subframe exceeds the maximum number of MRs that a UE is able to measure in one subframe, wherein the MR with lower priority is determined to be disregarded, and the priority of the measurement resource is increased according to previous disregarding(s) of the measurement resource.

In a further aspect of the present disclosure, there is provided a wireless communication device of configuring a measurement resource (MR), comprising: a disregarding determination unit configured to determine a MR to be disregarded when the number of MRs configured in one subframe exceeds the maximum number of MRs that a UE is able to measure in one subframe, wherein the MR with lower priority is determined to be disregarded; and a priority increasing unit configured to increase the priority of MR(s) related to a channel state information (CSI) report which is aperiodically triggered to be higher than other MR(s) when the MR(s) related to the CSI is between the aperiodic trigger and relevant uplink (UL) CSI report.

In a further aspect of the present disclosure, there is provided a wireless communication device of configuring a measurement resource (MR), comprising: a disregarding determination unit configured to determine a MR to be disregarded when the number of MRs configured in one subframe exceeds the maximum number of MRs that a UE is able to measure in one subframe, wherein each configured MR is disregarded one or more times in a round robin manner, and the MR with lower priority is disregarded no less than the one with higher priority.

BRIEF DESCRIPTION OF THE SEVERAL VIEWS OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered as limiting of its scope, the disclosure will be described with additional specificity and detail through use of the accompanying drawings, in which:

DETAILED DESCRIPTION

Figure 1:
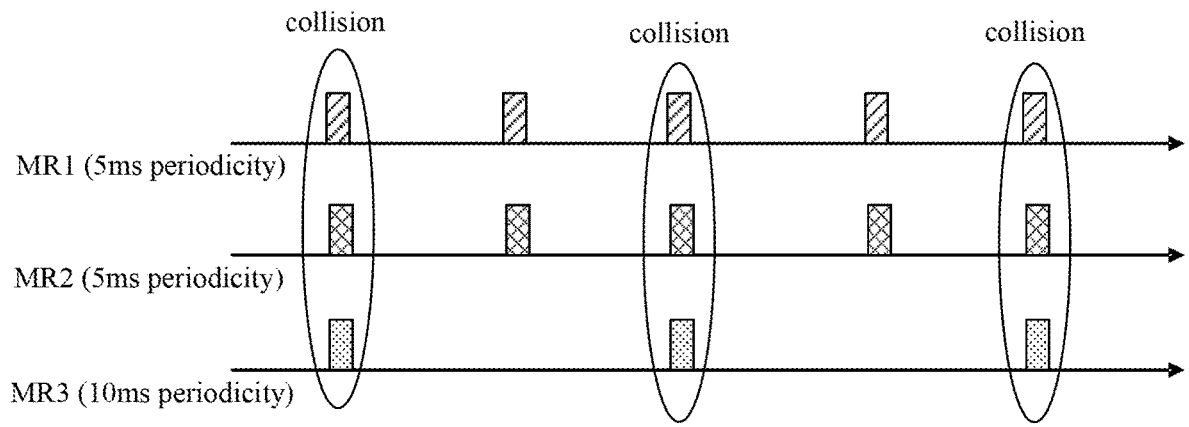
FIG. 1 schematically shows an example of MR collision.
Figure 2:
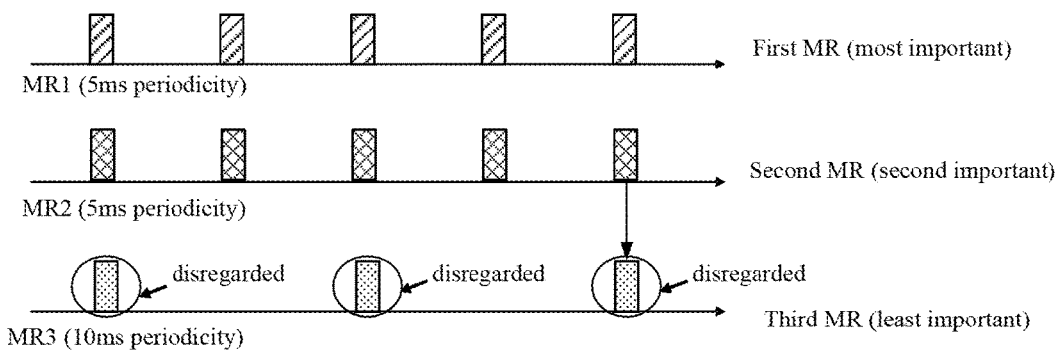
FIG. 2 schematically shows the problem of disregarding solution purely based on priority.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

First Embodiment

The first Embodiment of the present disclosure provides a wireless communication method of configuring a measurement resource (MR), comprising: determining a MR to be disregarded when the number of MRs configured in one subframe exceeds the maximum number of MRs that a UE is able to measure in one subframe, wherein the MR with lower priority is determined to be disregarded, and the MR is not disregarded A times within the duration of N subframes, where A is an integer larger than 1, N corresponds to one plus B*periodicity of the MR, and B is an integer equal to or larger than 1. A and B can be configured by eNB or specified as fixed value. Larger A and smaller B means more disregarding of the related MR.

Figure 3:
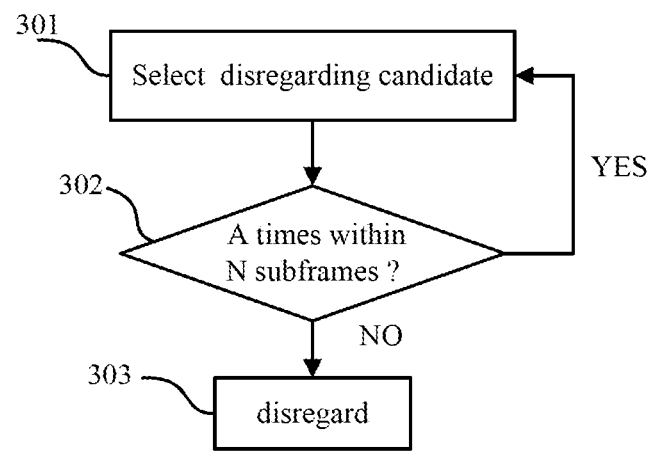
FIG. 3 schematically shows an exemplary flowchart of the method of disregarding MR according to the first embodiment.

FIG. 3 shows a flowchart of an exemplary implementation of the MR disregarding method (i.e., the wireless communication method of configuring MR) according to the first embodiment. At step 301, a MR with the lowest priority is selected as a disregarding candidate (first candidate). At step 302, a determination is made as to whether the candidate selected at step 301 is disregarded A times within N subframes if it is disregarded this time. If the candidate is not disregarded A times within N subframes for this disregarding (NO), then the process goes to step 303, at which the candidate is determined to be disregarded. If the candidate is disregarded A times within N subframes for this disregarding (YES), then the process returns back to step 301, at which a further MR with the lowest priority among the MRs other than the first candidate is selected as a disregarding candidate (second candidate). Similar process will be conducted for the second candidate as for the first candidate. If there are more than one MRs needed to be disregarded, i.e., the number of MRs configured in one subframe exceeds the maximum number of MRs that a user equipment (UE) is able to measure in one subframe by more than one, the above steps 301-303 will be repeated for corresponding times. As mentioned in the Background, if a MR is disregarded, it is possible to report CSI calculated using old measurement results or report CSI with invalid flag (out-of-range).

However, it is noted that FIG. 3 is only an example to implement the two conditions, and other step flows may also be used to implement the method according to the first embodiment. For example, the determination as to whether a MR is disregarded A times within N subframes for the current disregarding may be conducted before selecting a MR with the lowest priority, in other words, the MR(s) which are disregarded A times within N subframes can be ruled out first, and then the MR(s) with the lowest priority among the remaining MRs are determined to be disregarded.

In the following, several examples for parameters A and B are described in detail. The parameters A and B may be configured by eNB, but may also be specified as fixed values.

Figure 4:
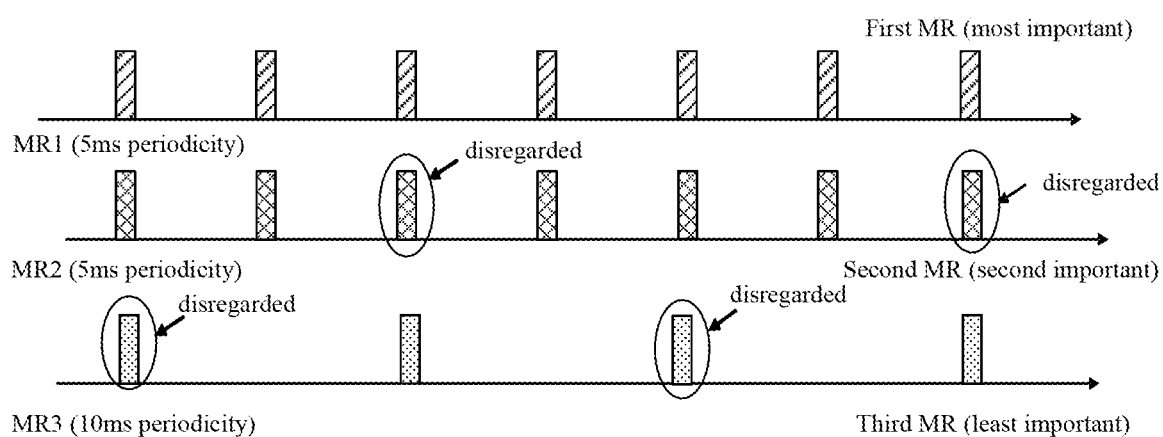
FIG. 4 schematically shows an example of the method of disregarding MR according to the first embodiment.

FIG. 4 shows an example of A=2 and B=1 according to the first embodiment of the present disclosure. As shown in FIG. 4, there are configured three MRs with the priority in order of MR1, MR2, and MR3, and UE can only measure two MRs in one subframe; therefore, one MR in each collision subframe should be disregarded. In this example, MR1 and MR2 have the periodicity of 5 ms (i.e., 5 subframes), and MR3 has the periodicity of 10 ms (i.e., 10 subframes); therefore, for MR1 and MR2, N=1+B*5=6, and for MR3, N=1+B*10+1=11. According to the constraint of the first embodiment, MR1 and MR2 should not be disregarded twice within 6 subframes, and MR3 should not be disregarded twice within 11 subframes. For the first collision subframe (the leftmost subframe in FIG. 4), MR3 with the lowest priority will be considered as a disregarding candidate, and since MR3 is disregarded for the first time, it satisfies the condition that MR3 is not disregarded twice within 11 subframes; therefore, MR3 is disregarded in this subframe. Then, for the second collision subframe where MR3 appears for the second time, if MR3 were also disregarded, MR3 would be disregarded for the second time within 11 subframes (counted inclusively from the first collision subframe to the second collision subframe), which does not stratify the condition that MR3 should not be disregarded twice within 11 subframes. Therefore, MR3 is not determined to be disregarded in the second collision subframe though it has the lowest priority. At this point, only M1 and M2 can be considered to be disregarded. Since M2 has lower priority and it is not disregarded twice within 6 subframes, M2 is determined to be disregarded in the second collision subframe. With the similar determination manner, M3 and M2 are disregarded respectively in the third and fourth collision subframes. It is seen from the above description that more important MR is disregarded less and the least important MR (MR3 in this example) is not always disregarded based on a simple specification description. However, it is noted that A is not limited to 2 and B is not limited to 1, rather A can be any integer larger than 1 (e.g., 2, 3, 4 . . . ) and B can be any integer equal to or larger than 1 (e.g., 1, 2, 3, 4 . . . ). In addition, the configured MRs are not limited to three, and the MRs that a UE can measure in one subframe are not limited to two, rather the present disclosure can be applied to any configuration on them.

Figure 5:
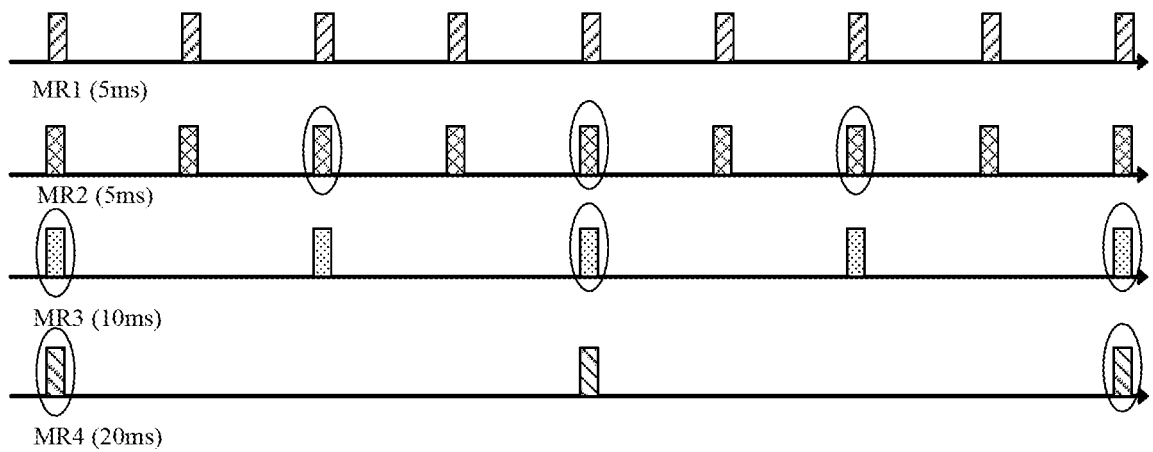
FIG. 5 schematically shows another example of the method of disregarding MR according to the first embodiment.

FIG. 5 shows another example of A=2 and B=1, in which four MRs with the priority in order of MR1, MR2, MR3, and MR4 are configured and UE can only measure two MRs in one subframe. Therefore, one MR in some collision subframe(s) and two MRs in some other collision subframe(s) should be disregarded. In this example, MR1 and MR2 have the periodicity of 5 ms (i.e., 5 subframes), MR3 has the periodicity of 10 ms (i.e., 10 subframes), and MR4 has the periodicity of 20 ms (i.e., 20 subframes); therefore, for MR1 and MR2, N=1+B*5=6, for MR3, N=1+B*10+1=11, and for MR4, N=1+B*20+1=21. According to the constraint of the first embodiment, MR1 and MR2 should not be disregarded twice within 6 subframes, MR3 should not be disregarded twice within 11 subframes, and MR4 should not be disregarded twice within 21 subframes. For the first collision subframe (the leftmost subframe in FIG. 5), there exist four MRs, and thus two MRs should be selected to be disregarded. MR3 and MR4 which have lower priority are first considered as disregarding candidates, and since MR3 and MR3 are disregarded for the first time, it is satisfied that MR3 is not disregarded twice within 11 subframes and MR4 is not disregarded twice within 21 subframes; therefore, MR3 and MR4 are disregarded in this subframe. Then, for the second collision subframe where MR3 appears for the second time, there only exist three MRs (MR1, MR2, and MR3) and thus only one MR should be disregarded. Here, if MR3 were also disregarded, MR3 would be disregarded for the second time within 11 subframes (counted inclusively from the first collision subframe to the second collision subframe), which does not satisfy the condition that MR3 should not be disregarded twice within 11 subframes. Therefore, MR3 is not determined to be disregarded in the second collision subframe though it has the lowest priority. At this point, only M1 and M2 can be considered to be disregarded. Since M2 has lower priority and it is not disregarded twice within 6 subframes, M2 is determined to be disregarded in the second collision subframe. For the third collision subframe where MR3 appears for the third time, there exit four MRs, and thus two MRs should be disregarded. Here, although MR4 has the lowest priority, it would be disregarded for the second time within 21 subframes, if MR4 were disregarded in this subframe; therefore, MR4 are not disregarded in this subframe, and MR2 and MR3 are disregarded in this subframe since they have lower priority than MR1 and they are not disregarded twice within respective 6 and 11 subframes. Based on the similar determination manner, MR2 is disregarded in the third collision subframe, and MR3 and MR4 are disregarded in the fourth collision subframe. With the above described manner of disregarding a MR, within 40 ms (40 subframes), MR1 is disregarded zero time (0%), MR2 is disregarded three times (37.5% of the total number of MR2), MR3 is disregarded twice (50% of the total number of MR3), and MR4 is disregarded once (50% of the total number of MR4). It is derived that more important MR is disregarded less and no MR is always disregarded.

Figure 6:
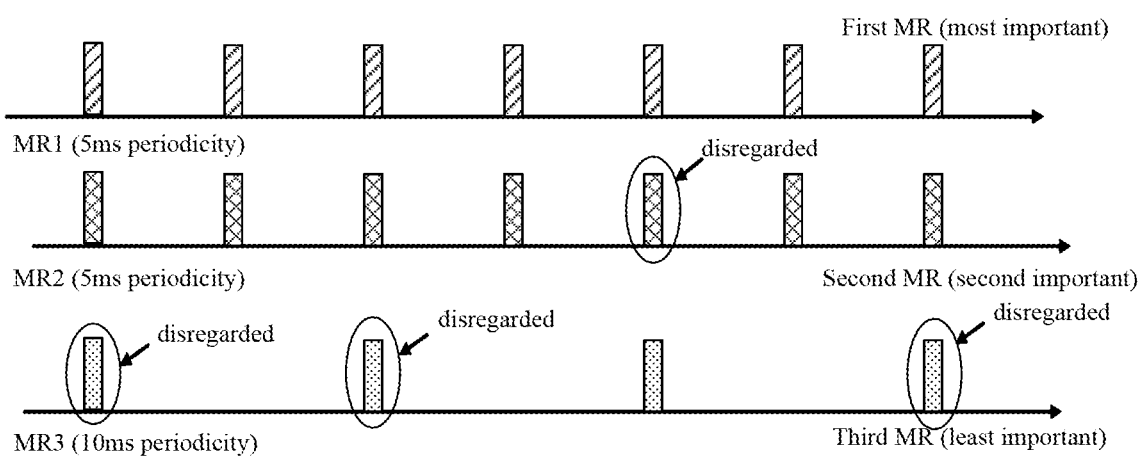
FIG. 6 schematically shows another example of the method of disregarding MR according to the first embodiment.

Further, in order to disregard less important MR(s) more, different values of A and B can be configured for different MRs. FIG. 6 shows an example of A=3, B=2 for the least important MR (MR3 in FIG. 6), and A=2, B=1 for other MRs (MR1 and MR2 in FIG. 6), wherein three MRs are configured, and an UE can measure two MRs in one subframe. As shown in FIG. 6, the constraint according to the first embodiment for MR1 to MR3 is that MR3 is not disregarded three times within 21 (21=1+2*10) subframes and MR1 and MR2 are not disregarded twice within 6 (6=1+5) subframes. Therefore, based on the determination manner similar to FIG. 4, MR3 is determined to be disregarded for the first, second and fourth collision subframes in FIG. 6 since MR3 is not disregarded three times within 21 subframes at these subframes and MR3 has the lowest priority, and MR2 is determined to be disregarded for the third collision subframe since MR3 which has lower priority than MR2 would be disregarded three times within 21 subframes if MR3 were disregarded in this collision subframe. According to the configuration of FIG. 6, the less important MR3 is disregarded more compared with the configuration of FIG. 4.

Figure 7:
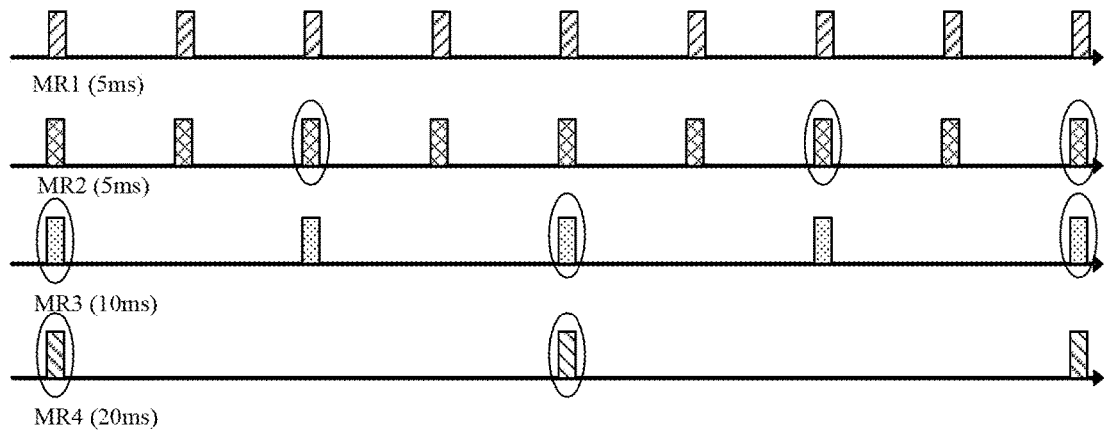
FIG. 7 schematically shows another example of the method of disregarding MR according to the first embodiment.

FIG. 7 shows an example of A=3, B=2 for the least important MR (MR4 in FIG. 7), and A=2, B=1 for other MRs (MR1, MR2 and MR3 in FIG. 7), wherein four MRs are configured, and an UE can measure two MRs in one subframe. As shown in FIG. 7, the constraint according to the first embodiment for MR1 to MR4 is that MR4 is not disregarded three times within 41 (41=1+2*20) subframes, MR1 and MR2 are not disregarded twice within 6 (6=1+5) subframes, and MR3 are not disregarded twice within 11 (11=1+10) subframes. Therefore, based on the determination manner similar to FIG. 5, both MR3 and MR4 are determined to be disregarded for the first and third collision subframes, both MR2 and MR4 are determined to be disregarded for the fifth collision subframe, and only MR2 is determined to be disregarded for the second and fourth collision subframes. With the configuration of FIG. 7, within 60 ms (60 subframes), MR1 is disregarded zero time (0%), MR2 is disregarded four times (33% of the total number of MR2), MR3 is disregarded three times (50% of the total number of MR3), and MR4 is disregarded twice (66% of the total number of MR4). It is obvious that the less important MR4 is disregarded more compared with the configuration of FIG. 5.

Figure 8:
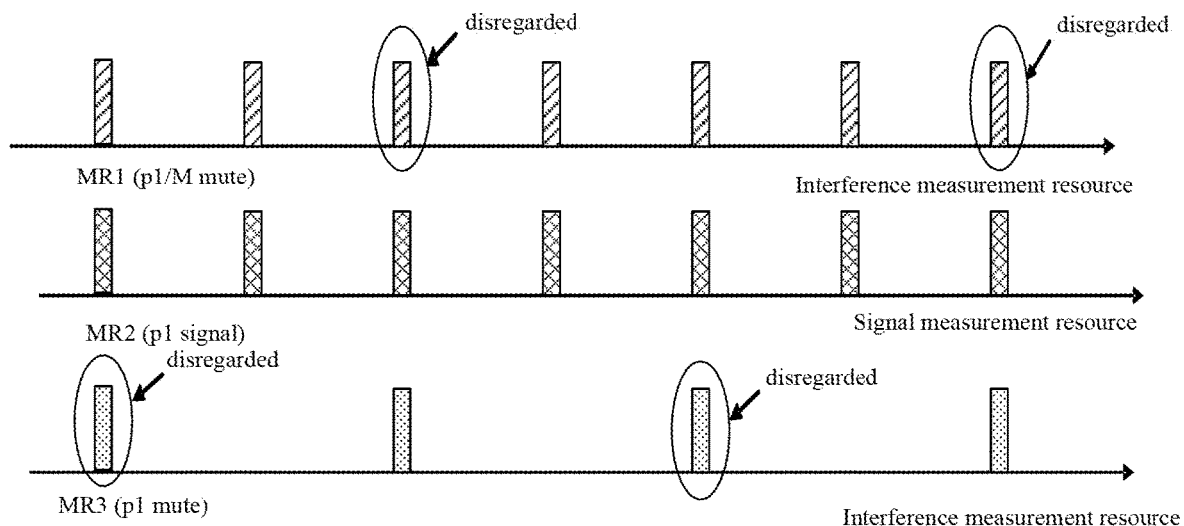
FIG. 8 schematically shows an example of distinguishing between SMR and IMR according to the first embodiment.

Further, it may be advantageous to distinguish between signal measurement resource (SMR) and interference measurement resource (IMR). For example, in practice, SMR may be more important than IMR; therefore, eNB implementation may assign higher priority to SMR. Alternatively, MR priority can be fixed in the specification. For example, SMR can be configured to have higher priority than IMR. FIG. 8 shows an example distinguishing SMR and IMR. In this example, MR1 and MR3 are IMRs, and MR2 is SMR, so MR2 has higher priority than MR1 and MR3. In addition, eNB configures MR3 has lower priority than MR1. Based on the same determination manner with respect to FIG. 4, MR2 is less disregarded (not disregarded at all in this case) since it is a SMR. It is noted that SMR may also be configured to have lower priority than IMR. In addition, the concept of distinguishing between SMR and IMR may also be applied to other embodiments.

Figures 9, 10:
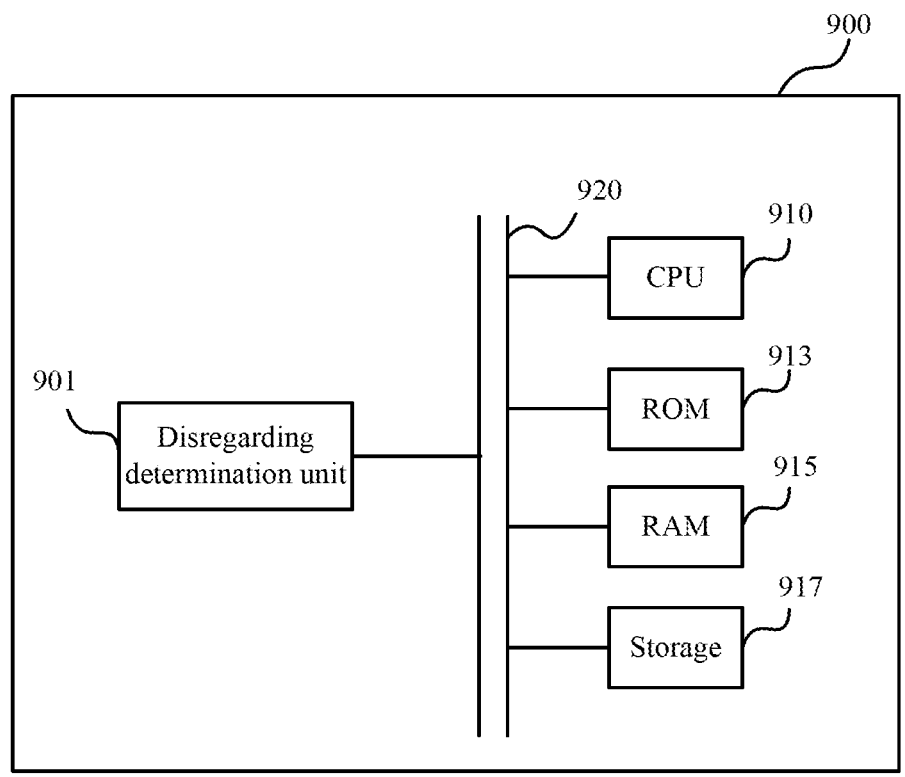
FIG. 9 is a block diagram schematically showing a wireless communication device 900 according to the first embodiment.
FIG. 10 is a flowchart showing the method of disregarding MR according to the second embodiment.

FIG. 9 is a block diagram showing a wireless communication device 900 according to the first embodiment of the present disclosure. The wireless communication device could be a UE or an eNB. The wireless communication device 900 includes a MR disregarding determination unit 901 configured to determine a MR to be disregarded when the number of MRs configured in one subframe exceeds the maximum number of MRs that a UE is able to measure in one subframe, wherein the MR with lower priority is determined to be disregarded, and the MR is not disregarded A times within the duration of N subframes, where A is an integer larger than 1, N corresponds to one plus B*periodicity of the MR in the unit of subframe, and B is an integer equal to or larger than 1. The wireless communication device 900 according to the present disclosure may further include a CPU (Central Processing Unit) 910 for executing related programs to process various data and control operations of respective units in the wireless communication device 900, a ROM (Read Only Memory) 913 for storing various programs required for performing various process and control by the CPU 910, a RAM (Random Access Memory) 915 for storing intermediate data temporarily produced in the procedure of process and control by the CPU 910, and/or a storage unit 917 for storing various programs, data and so on. The above MR disregarding determination unit 901, CPU 910, ROM 913, RAM 915 and/or storage unit 917, etc., may be interconnected via data and/or command bus 920 and transfer signals between one another.

Respective units as described above do not limit the scope of the present disclosure. The functions of the MR disregarding determination unit 901 may be implemented as a separate unit, and may also be implemented by functional software in combination with the above CPU 910, ROM 913, RAM 915 and/or storage unit 917, etc.

Second Embodiment

The second embodiment of the present disclosure provides a wireless communication method of configuring a measurement resource (MR) a shown in FIG. 10, comprising: determining a MR to be disregarded when the number of MRs configured in one subframe exceeds the maximum number of MRs that a UE is able to measure in one subframe, wherein the MR with lower priority is determined to be disregarded, and the priority of the measurement resource is increased according to previous disregarding(s) of the measurement resource (1001).

Figure 11:
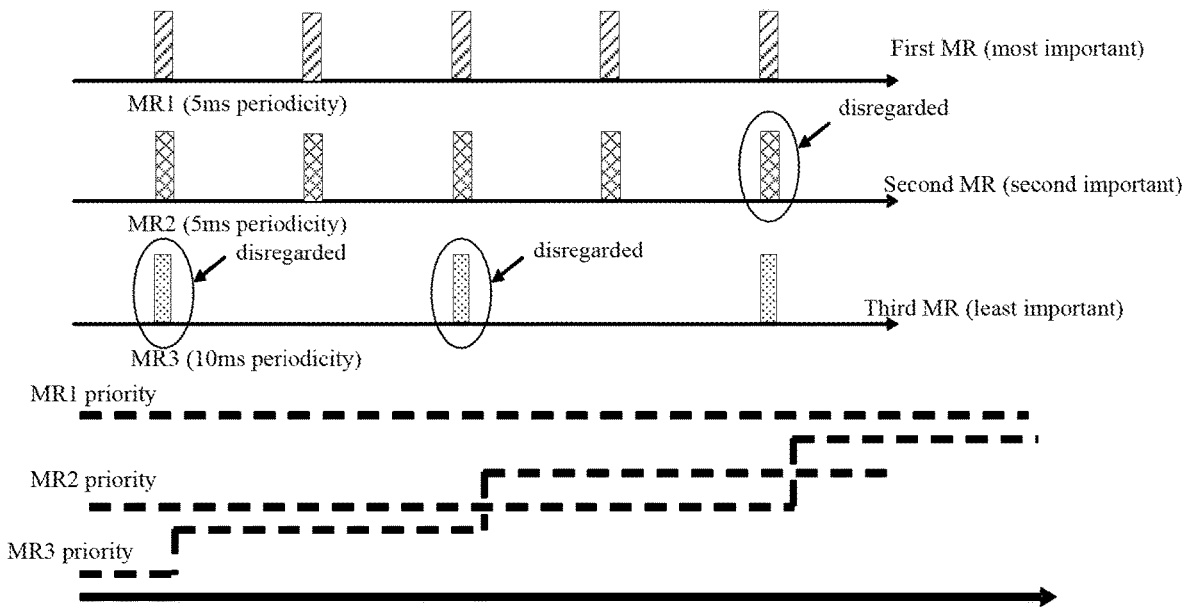
FIG. 11 schematically shows an example of the method of disregarding MR with adjustment of priority according to the second embodiment.

In order to avoid always disregarding the least important MR, the second embodiment provides a way to adjust priority based on disregarding. The eNB can configure each MR with an initial priority. The MR with lowest priority is determined to be disregarded, but the priority of a MR in current subframe can be increased according to the disregarding(s) of the MR in previous subframes. FIG. 11 shows an example of adjusting priority based on disregarding. As shown in FIG. 11, initially MR1 has the highest priority, MR3 has the lowest priority, and MR2 has the medium priority. MR3 is disregarded in the first collision subframe since it has the lowest priority. After this disregarding, the priority of MR3 is increased by a certain value (which can be configured by eNB) for the following subframes. In the second collision subframe, although the priority of MR3 is increased according to the first disregarding of MR3, it is still lower than MR2 (in other cases, the priority of MR3 can also be increased to be higher than MR2), and thus MR3 is also disregarded. Then, the priority of MR3 is increased again for the following subframes. Therefore, in the third collision subframe, the priority of MR3 is actually increased to be higher than MR2 according to the disregarding in both the first and the second collision subframes, and thus MR2 is disregarded since its priority is the lowest at this point. With the method according to the second embodiment with the adjustment of priority, no MR is always dropped. In addition, in order to avoid the priority of a MR being increased infinitely, the eNB can configure an effective window. The effective window is a time window and defined that only the previous disregarding(s) within the effective window can be considered to increase the priority of a MR in the current subframe. For example, if the effective window for MR3 is configured as 20 ms (20 subframes), and a MR in subframe n (current subframe) is considered, then only the disregarding(s) of the MR in a duration (effective window) from subframe n−20 to n−1 is considered to increase the priority of the MR in subframe n. In this way, only recent disregarding(s) are considered, and it is avoided to ever increase the priority of a MR.

Similar to the first embodiment, a wireless communication device according to the second embodiment can be configured, which can have a similar configuration to FIG. 9 except that the disregarding determination unit 901 is replaced by a disregarding determination unit configured to determine a MR to be disregarded when the number of MRs configured in one subframe exceeds the maximum number of MRs that a UE is able to measure in one subframe, wherein the MR with lower priority is determined to be disregarded, and the priority of the measurement resource is increased according to previous disregarding(s) of the measurement resource.

Third Embodiment

Figure 12:
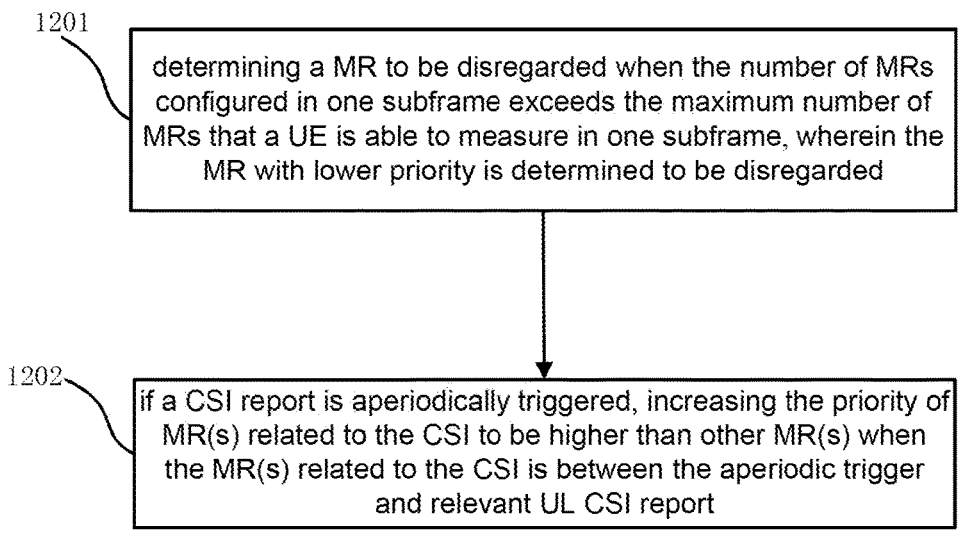
FIG. 12 is a flowchart showing the method of disregarding MR according to the third embodiment.

In order to avoid disregarding MR that is related to important CSI reports. For example, if a CSI report is aperiodically triggered, the relevant MR may not be disregarded when the MR is between the aperiodic trigger and relevant uplink (UL) CSI report. In view of this, the third embodiment of the present disclosure provides a wireless communication method of configuring a measurement resource (MR) as shown in FIG. 12, comprising: determining a MR to be disregarded when the number of MRs configured in one subframe exceeds the maximum number of MRs that a UE is able to measure in one subframe, wherein the MR with lower priority is determined to be disregarded (1201); and if a channel state information (CSI) report is aperiodically triggered, increasing the priority of MR(s) related to the CSI to be higher than other MR(s) when the MR(s) related to the CSI is between the aperiodic trigger and relevant uplink (UL) CSI report (1202).

Figure 13:
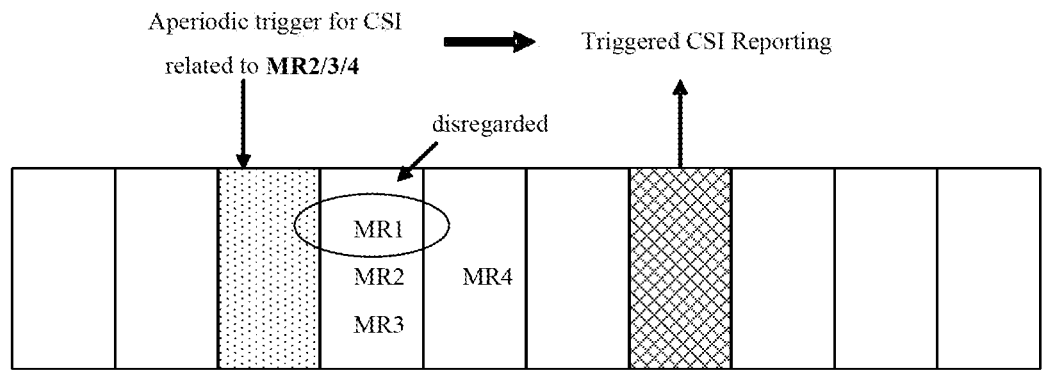
FIG. 13 schematically shows an example of the method of disregarding MR with adjustment of priority according to the third embodiment.

FIG. 13 shows an example of MRs between an aperiodic trigger and the relevant UL CSI reporting. As shown in FIG. 13, MR2, MR3, and MR4 are related to the CSI report, and thus the priority of MR2, MR3 and MR4 is increased to be higher than MR1 between the aperiodic trigger and the relevant UL CSI reporting. Therefore, MR1 is disregarded in the collision subframe since its priority is the lowest at this point. In this way, disregarding MR that is related to important CSI reports is avoided. It is noted that the concept of increasing the priority of MR that is related to aperiodic trigger for CSI reporting can also be applied to the first and second embodiment.

Further, Similar to the first embodiment, a wireless communication device according to the third embodiment can be configured, which can have a similar configuration to FIG. 9 except that the disregarding determination unit 901 is replaced by a disregarding determination unit configured to determine a MR to be disregarded when the number of MRs configured in one subframe exceeds the maximum number of MRs that a UE is able to measure in one subframe, wherein the MR with lower priority is determined to be disregarded, and a priority increasing unit configured to increase the priority of MR(s) related to a channel state information (CSI) report which is aperiodically triggered to be higher than other MR(s) when the MR(s) related to the CSI is between the aperiodic trigger and relevant uplink (UL) CSI report.

Fourth Embodiment

In order to avoid always disregarding the least import MR, a fourth embodiment of the present disclosure provides a wireless communication method of a wireless communication method of configuring a measurement resource (MR), comprising: determining a MR to be disregarded when the number of MRs configured in one subframe exceeds the maximum number of MRs that a UE is able to measure in one subframe, wherein each configured MR is disregarded one or more times in a round robin manner, and the MR with lower priority is disregarded no less than the one with higher priority.

Figure 14:
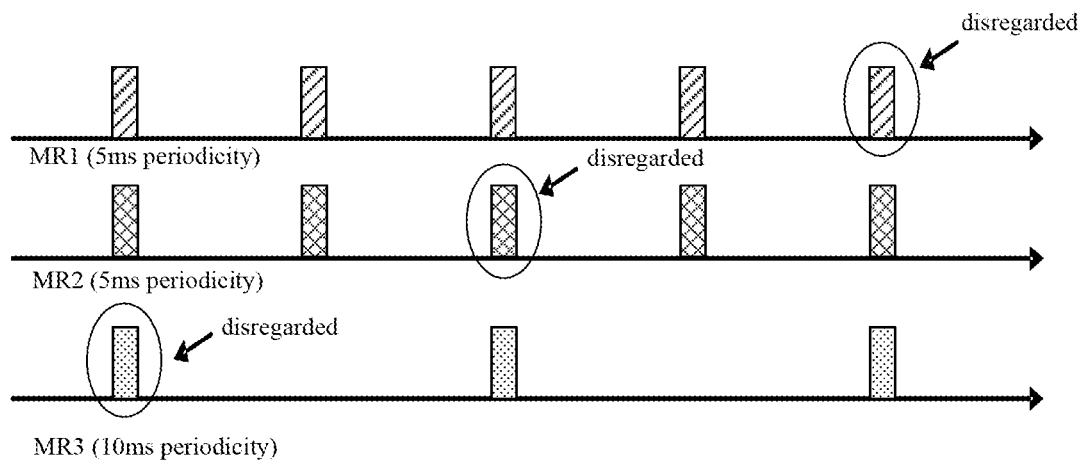
FIG. 14 schematically shows an example of the method of disregarding MR in a round robin manner according to the fourth embodiment.

First, the UE can disregard different MR in a basic round robin manner in different collision subframes, i.e., each configured MR is disregarded once within one cycle in a round robin manner. FIG. 14 shows an example of a disregarding method based on a basic round robin manner. In this example, MR3, MR2 and MR1 are disregarded one after another in a cycling manner. Specifically, MR3 is disregarded in the first collision subframe, MR2 is disregarded in the second collision subframe, and then MR1 is disregarded in the third collision subframe.

Figure 15:
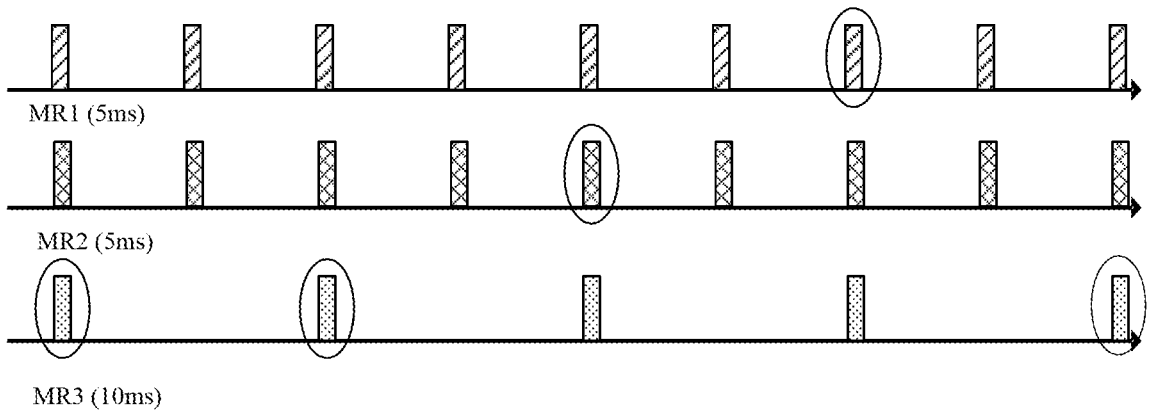
FIG. 15 schematically shows an example of the method of disregarding MR based on the combination of round robin and priority according to the fourth embodiment.

As an improvement to the basic round robin manner, it is possible to use the combination of round robin and priority, in other words, each configured MR is disregarded one or more times in a round robin manner, and a MR with lower priority is disregarded no less than the one with higher priority in each cycle. FIG. 15 shows an example of the disregarding method based on the combination and round robin. In this example, MR3 has the lowest priority, so MR3 is configured to be disregarded twice in each cycle, and MR1 and MR2 are configured to be only disregarded once in each cycle. Specifically, MR3 is disregarded twice in the first and second collision subframes, MR2 is disregarded once in the third collision subframe, and then MR1 is disregarded once in the fourth collision subframe. After this cycle, the same pattern will be repeated for the next cycle, and so on. With the combination of round bobbin and priority, no MR will always be disregarded, and the less important MR can be disregarded more.

Further, Similar to the first embodiment, a wireless communication device according to the fourth embodiment can be configured, which can have a similar configuration to FIG. 9 except that the disregarding determination unit 901 is replaced by a disregarding determination unit configured to determine a MR to be disregarded when the number of MRs configured in one subframe exceeds the maximum number of MRs that a UE is able to measure in one subframe, wherein each configured MR is disregarded one or more times in a round robin manner, and the MR with lower priority is disregarded no less than the one with higher priority.

The present disclosure can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

The invention claimed is:

1. A wireless communication terminal, comprising:
a transmitter, which, in operation, transmits CSI (Channel State Information) to a base station, and
circuitry, which is coupled to the transmitter and which, in operation, determines at least one measurement resource, among at least two measurement resources configured per subframe, to be unreported when a number of the measurement resources configured in one subframe exceeds a maximum number of measurement resources supported by the wireless communication terminal in one subframe, determines not to update CSI for the determined measurement resource per subframe, wherein the at least one measurement resource is determined based on a lowest priority assigned thereto and based on a number of measurement resources unreported within N subframes before a subframe in which the configured measurement resource corresponding to the unreported measurement resource is transmitted, wherein N is an integer equal to or greater than 1.

2. The wireless communication terminal according to claim 1, wherein a signal measurement resource is configured to have higher priority than an interference measurement resource.

3. The wireless communication terminal according to claim 1, wherein the circuitry, in operation, increases the priority of measurement resource(s) related to a CSI report, which is aperiodically triggered, to be higher than other measurement resource(s) when the measurement resource(s) related to the CSI report are between an aperiodic trigger and a relevant uplink CSI report.

4. The wireless communication terminal according to claim 1, wherein
the priority of the measurement resource is increased according to previous unreporting(s) of the measurement resource.

5. The wireless communication terminal according to claim 4, wherein
only previous unreporting(s) of the measurement resource within an effective window is considered to increase the priority of the measurement resource.

6. The wireless communication terminal according to claim 4, wherein the circuitry, in operation, increases the priority of measurement resource(s) related to a CSI report, which is aperiodically triggered, to be higher than other measurement resource(s) when the measurement resource(s) related to the CSI report are between an aperiodic trigger and a relevant uplink CSI report.

7. The wireless communication terminal according to claim 1, wherein
each configured measurement resource is unreported one or more times in a round robin manner, and
the measurement resource with lower priority is unreported no less than the one with higher priority.

8. The wireless communication terminal according to claim 1, wherein the measurement resource is not unreported A times within the duration of N subframes, where A is an integer larger than 1, N corresponds to one plus B*periodicity of the measurement resource, and B is an integer equal to or larger than 1.

9. The wireless communication terminal according to claim 8, wherein A is equal to 2, and B is equal to 1.

10. The wireless communication terminal according to claim 8, wherein for the measurement resource with the lowest priority, A is equal to 3, and B is equal to 2, and for other measurement resource(s), A is equal to 2, and B is equal to 1.

11. A wireless communication method, comprising:
transmitting CSI (Channel State Information) to a base station;
determining at least one measurement resource, among at least two measurement resources configured per subframe, to be unreported when a number of the measurement resources configured in one subframe exceeds a maximum number of measurement resources supported by the wireless communication terminal in one subframe; and
determining not to update the CSI for the determined measurement resource per subframe;
wherein the at least one measurement resource is determined based on a lowest priority assigned thereto and based on a number of measurement resources unreported within N subframes before a subframe in which the configured measurement resource corresponding to the unreported measurement resource is transmitted, wherein N is an integer equal to or greater than 1.

12. The wireless communication method according to claim 11, wherein a signal measurement resource is configured to have higher priority than an interference measurement resource.

13. The wireless communication method according to claim 11, comprising:
increasing the priority of measurement resource(s) related to a CSI report, which is aperiodically triggered, to be higher than other measurement resource(s) when the measurement resource(s) related to the CSI report are between an aperiodic trigger and a relevant uplink CSI report.

14. The wireless communication method according to claim 11, wherein
the priority of the measurement resource is increased according to previous unreporting(s) of the measurement resource.

15. The wireless communication method according to claim 14, wherein
only previous unreporting(s) of the measurement resource within an effective window is considered to increase the priority of the measurement resource.

16. The wireless communication method according to claim 14, comprising:
increasing the priority of measurement resource(s) related to a CSI report, which is aperiodically triggered, to be higher than other measurement resource(s) when the measurement resource(s) related to the CSI report are between an aperiodic trigger and a relevant uplink CSI report.

17. The wireless communication method according to claim 11, wherein
   each configured measurement resource is unreported one or more times in a round robin manner, and
   the measurement resource with lower priority is unreported no less than the one with higher priority.

18. The wireless communication method according to claim 11, wherein the measurement resource is not unreported A times within the duration of N subframes, where A is an integer larger than 1, N corresponds to one plus B*periodicity of the measurement resource, and B is an integer equal to or larger than 1.

19. The wireless communication method according to claim 18, wherein A is equal to 2, and B is equal to 1.

20. The wireless communication method according to claim 18, wherein for the measurement resource with the lowest priority, A is equal to 3, and B is equal to 2, and for other measurement resource(s), A is equal to 2, and B is equal to 1.

* * * * *